W. M. PRZYBYLA.
COMBINED WATCH CHAIN AND CHARM.
APPLICATION FILED SEPT. 1, 1920.
1,371,932.  Patented Mar. 15, 1921.
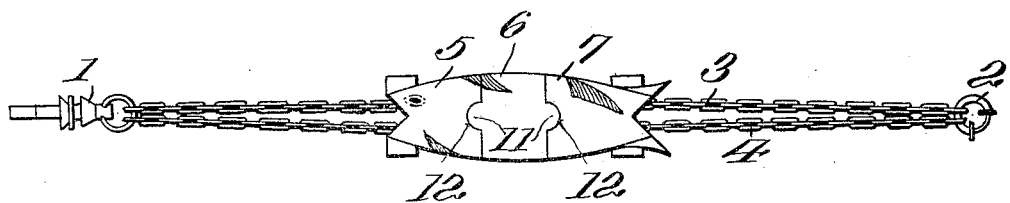
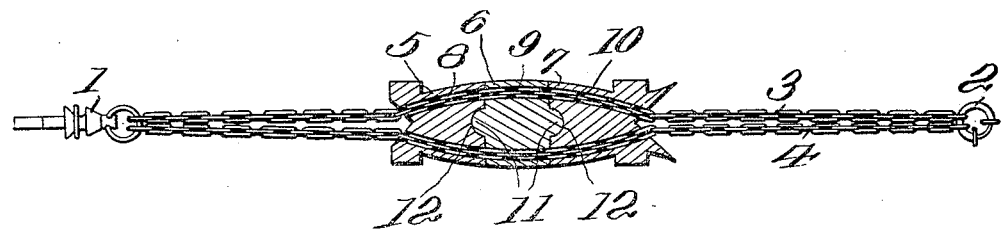
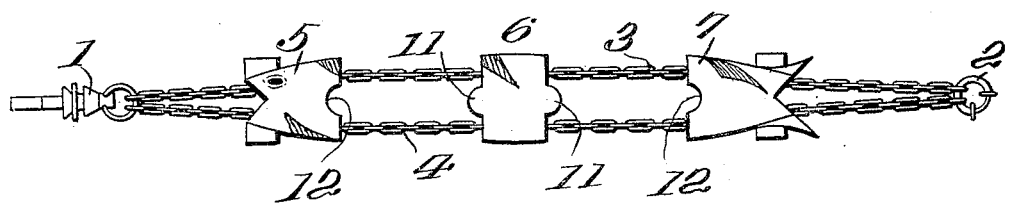
Inventor
W. M. Przybyla,
By A. S. Pattison
Attorney

UNITED STATES PATENT OFFICE.

WALENTY M. PRZYBYŁA, OF METZ, MICHIGAN.

COMBINED WATCH-CHAIN AND CHARM.

1,371,932. Specification of Letters Patent. Patented Mar. 15, 1921.

Application filed September 1, 1920. Serial No. 407,460.

*To all whom it may concern:*

Be it known that I, WALENTY M. PRZYBYŁA, a citizen of the United States, residing at Metz, in the county of Presque Isle and State of Michigan, have invented certain new and useful Improvements in Combined Watch - Chains and Charms, of which the following is a specification, reference being had therein to the accompanying drawing.

My invention relates to new and useful improvements in combined watch chains and charms, and has for an object the construction of a combined chain and charm which is cheap and simple yet pleasing to the eye and of a useful nature.

A further object of my invention is to provide a combined watch chain and charm in which the charm comprises a plurality of parts slidable on the chain and so arranged that when the several parts are brought together the united parts will constitute some ornamental natural object, as a fish for example, or may be inscribed thereon the several parts of a name, motto or a picture, which will be legible and pleasing to those privileged to see the charm in united position.

In the accompanying drawings—

Figure 1 is a view in side elevation of my improved combined chain and charm, the charm being in united position.

Fig. 2 is a view of my invention in combined side elevation and longitudinal section through the charm, the charm being shown in united relation.

Fig. 3 is a view of my improved invention in side elevation, the parts of the charm being shown in separated position.

Referring now to the drawings, in which like parts are designated by similar characters, the snap-hook 1 and chain ring 2 are the usual chain end attachments common in the art.

The snap hook 1 and chain ring 2 are joined by a two-strand chain composed of the strands 3 and 4, upon which are slidably mounted the charm members 5, 6 and 7.

These charm members are provided with upper and lower chain receiving openings 8, 9 and 10, through which the strands of the chain pass and upon which the charm members slide.

Due to the natural weight and sag of the chain and to the fact that the chain openings are in a curved plane the friction of the chain in the openings is of considerable amount and once the charm members are adjusted in separated or united relation they will retain that position until manually set otherwise.

In the drawings, as a means of illustration, I have shown the charm in the form of a fish, its head being member 5, its body member 6, and its tail member 7.

To further aid in holding the charm members in their united position when so set, I have provided the middle member 6 with semi-circular projections 11, which fit into depressions 12 in the members 5 and 7.

It will be understood that the charm could be made into any desired object, animal, picture, design, motto or the like which might please the fancy of the owner, and that the supplemental position retaining means 11 and 12 could be altered in shape or size without departing from the spirit of my invention.

To facilitate in more easily separating the charm members, I have provided the two end members 5 and 7 with the shoulders 13, which can be grasped between the fingers of the wearer or whoever may operate the charm.

Having thus described my invention, what I claim and desire to secure by Letters Patent is:

1. The combination of a chain and a chain charm, the charm composed of a plurality of members, each member representing a part of an object, and the members slidable on the chain, whereby when the members are moved into engagement the complete object is disclosed.

2. The combination of a chain and a chain charm, the charm composed of a plurality of members, each charm member representing part of an object and having chain receiving openings, the chain openings passing in a curved line through the members so as to frictionally engage the chain, and the charm members slidable on the chain whereby a complete object can be formed by the charm members.

3. In a combined chain and chain charm, a two-strand chain, a charm composed of a plurality of members, each member representing part of an object and provided with chain receiving openings, the chain openings being in a curved line through the members so as to frictionally engage the chain and thereby retain the charm members in their set positions, and the charm members slidable on the chain whereby a complete object can be formed by the charm members for the purpose described.

In testimony whereof I hereunto affix my signature.

WALENTY M. PRZYBYŁA.

Witnesses:
G. COVEY, Jr.,
C. H. OSGOOD.